Sept. 26, 1967 R. E. BONNER 3,344,399

SEGMENTATION METHOD AND APPARATUS

Filed Dec. 17, 1964 2 Sheets-Sheet 1

INVENTOR.
RAYMOND E. BONNER

BY Robert C. Sandt

AGENT

United States Patent Office 3,344,399
Patented Sept. 26, 1967

3,344,399

SEGMENTATION METHOD AND APPARATUS

Raymond E. Bonner, Yorktown Heights, N.Y., assignor to International Business Machines Corporation, New York, N.Y., a corporation of New York Filed Dec. 17, 1964, Ser. No. 419,049
1 Claim. (Cl. 340—146.3)

This invention relates to automated reading machines, and more particularly to improvements in the method of and apparatus for defining the configuration of lexical symbols, especially handwritten ones, in a notation susceptible to processing by digital data techniques.

Reading machines, or character recognition machines, scan printed lexical symbols with some form of flying spot scanner to generate raw shape data for processing. The trace pattern which the scanner follows may be a fixed one, as in a raster scan, or it may vary for each different symbol, as it does in the curve follower type of apparatus. Whatever form the character recognition machine assumes, there is always the problem of defining the shape of the various symbols in a notation compatible with the machine structure. With the advent of digital data processing machines, it is becoming more popular to express symbol shapes in digital terms. This notation exploits the binary relationship of presence or absence, and combines this relationship in various logical connectives through suitable coding techniques. Characteristic features may, therefore, be encoded in binary, or in the special modified binary codes, and logically combined in various sequences to define any given shape. In fact, if one could afford the luxury of unlimited hardware, he could construct a machine which would recognize all but the most obscurely formed symbols. However, since economics plays so important a role in our modern economy, a character recognition machine must be optimally designed so as to minimize the number of seldom used circuits and components. This necessarily compels the machine designer to define the symbol shapes in the most definitive fashion.

When a character recognition machine must read handwritten lexical symbols, its design becomes extremely difficult. Cursive script is certainly the least formalized of all lexical symbol forms. With so many possible variations in form, it is difficult for the machine designer to comprehend all of the possible shapes and to assign the proper weight to each of the variations. He can, of course, build his machine and then run samples through it, testing for accuracy. He can also examine the shape of the symbols the machine failed to identify correctly and seek to amend his circuits to compensate for the particular variation. This "mustard-plaster" type of design usually results in an unnecessarily large machine with many redundant and seldom used circuits.

A preferable mode of procedure is to allow the data sample itself to assist in the design of the machine. In the ultimate, this results in the so-called "learning machine," which can also become extremely complex and inefficient. A more effective compromise is to employ the scanner which is to be used in the final design of the character recognition machine to scan a large sampling of lexical symbols whose identities are known, and to produce statistical data relative to their shape characteristics. This data can then be utilized by the machine designer in ordering his machine structure for optimum performance.

A curve follower character recognition machine, such as that described by Greanias et al. in an article entitled, "The Recognition of Handwritten Numerals by Contour Analysis," appearing in the IBM Journal of Research and Development for January 1963, produces signals representing the successive velocity headings attained by the apparatus in tracing the outline of the symbol. These velocity headings, or slopes, are resolved into eight angular sectors representing the 45° sectors disposed symmetrically about the eight cardinal points of the compass rose. Additionally, the described apparatus provides signals representing the successive instantaneous orthogonal displacements relative to a fixed matrix upon which the symbol is electrically superimposed. These slope and matrix signals are then tested for persistence and sequence to yield feature tests. Finally, the feature tests are combined to identify the symbol.

While the electrical superimposition of the symbol upon the matrix effects a normalization of the gross size of the symbols, a further type of normalization is helpful. This normalization involves the use of segments within the body of the symbol, and when properly exploited, will improve the definition of handwritten symbols. When related to a curve follower, a segment is a portion of the trace between a pair of transition points. A transition point is that location in the trace wherein the velocity vector heading (or slope) changes from clockwise to counterclockwise rotation by more than two sectors. These segments, when inserted as markers into a succession of matrix and slope records tend to normalize disproportionalities in the formed characters.

Thus, the present invention offers a means for accepting the signals produced by a curve follower character recognition machine and producing segmenting signals in accordance with the dictates of the character shape.

It is, therefore, an object of this invention to provide an apparatus for segmenting a lexical symbol as a function of the shape of the symbol.

A further object of the invention is to provide an apparatus for dividing the shape of a character into a plurality of segments, each segment being defined as the trace of the line edge between any two points wherein the slope of the line edge undergoes a reversal in direction of more than a predetermined amount.

Another object of this invention is to provide an apparatus for operation in conjunction with a curve follower type of character recognition apparatus which produces a set of definitive characteristics for cursive script.

Yet another object of this invention is to provide an improved method for segmenting cursive script.

A still further object of this invention is to provide an apparatus for segmenting cursive script so as to minimize the variations in shape of the symbols represented thereby.

The foregoing and other objects, features and advantages of the invention will be apparent from the following more particular description of a preferred embodiment of the invention, as illustrated in the accompanying drawings.

Figure 1:
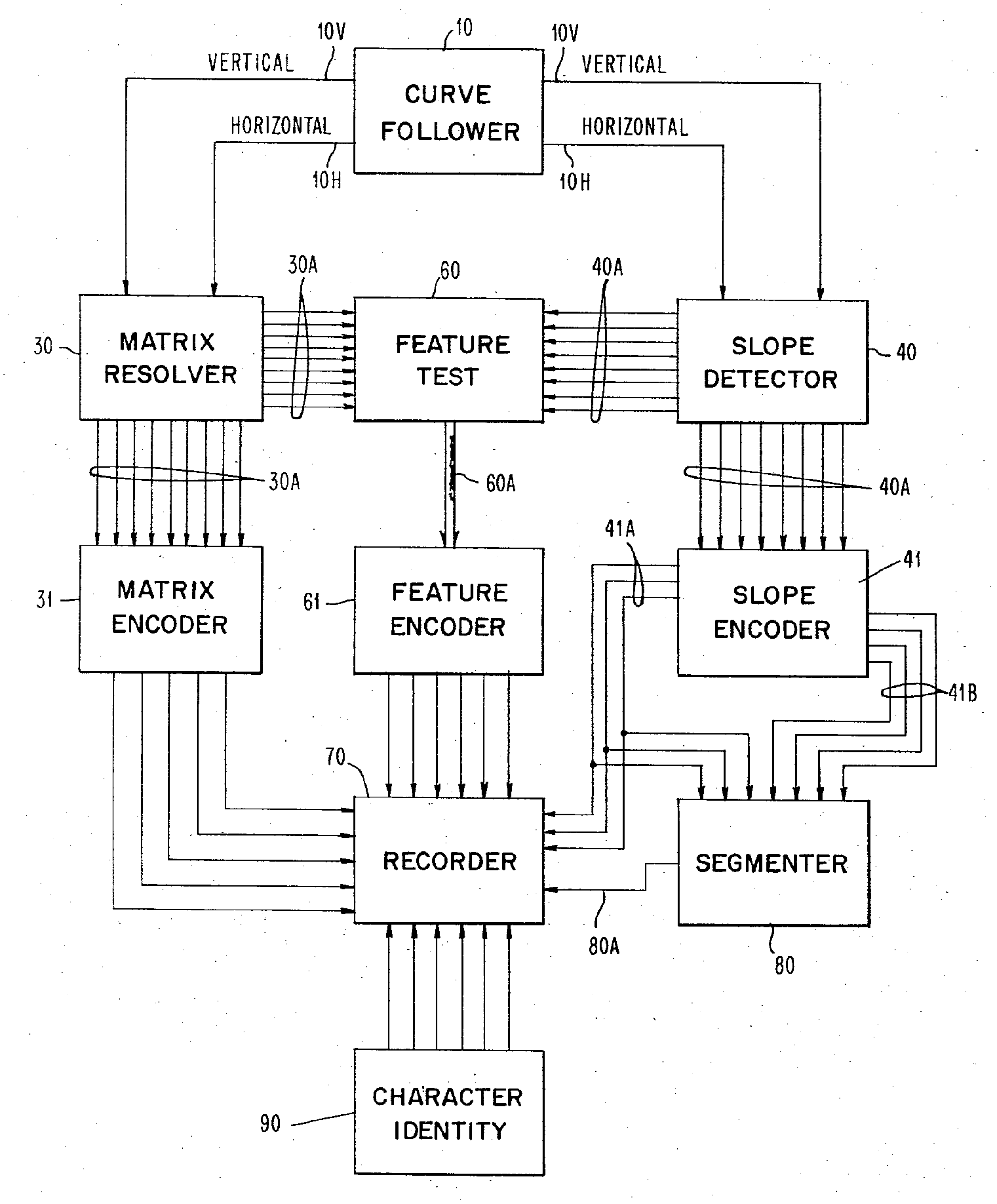
FIG. 1 is an overall schematic diagram of the connection of the invention with known prior art devices.

Referring now to FIG. 1 which shows the total environment in which the principles of the instant invention would preferably be exploited, the schematic showing, except for the recorder 70, the segmenter 80, and the various encoders, is substantially similar to that shown in the copending application of Greanias et al., Ser. No. 334,507, filed Dec. 30, 1963 and assigned to the same assignee as the present application. The curve follower 10, described in detail in the copending application of E. C. Greanias, Ser. No. 248,585, filed Dec. 31, 1962, now Patent No. 3,229,100 and assigned to the same assignee as the present application, produces time variant analog waveforms on the lines 10V and 10H, representing the successive orthogonal displacements of the cathode ray tube spot in following the line edge of the symbol being traced. These voltage waveforms are resolved into matrix positions in the matrix resolver 30 wherein the symbol is electrically superimposed on a 4 x 5 matrix so as to fully cover the matrix. The same displacement waveforms are processed in the slope detector 40 wherein the one-out-of-eight sector signals manifestive of the character slope are developed.

The matrix resolver 30 is more fully disclosed in application Ser. No. 305,255, filed Aug. 29, 1963, in the name of Greanias and Essinger, now Patent 3,248,699 and assigned to the same assignee as the present application. It operates to store a pair of voltages which measure the height and width of the symbol on a first measuring pass about the symbol. On the second and subsequent passes, the height and width voltages are divided into zones and compared against the instantaneous displacement voltages. One column and one row signal are provided on lines 30A to manifest the position of the trace relative to the character extremes. This effectively normalizes the gross size of each different character to a standard matrix size.

The slope detector 40 continuously differentiates the displacement waveforms appearing on lines 10V and 10H to thus obtain orthogonal velocity components. These the apparatus compares and resolves into the aforementioned eight sectors in the manner more fully described in the copending application of Greanias et al., Ser. No. 305,464, filed Aug. 29, 1963, and assigned to the same assignee as the present application. The slope signals appear as a one-out-of-eight code on lines 40A.

The matrix signals and slope detector signals are tested for persistence, sequence, and combinations in the feature test circuits 60 in the manner described in the above-identified Greanias et al. application, Ser. No. 334,507, filed Dec. 30, 1963. These signals appear as successive potentializations of the lines 60A as the features are found to exist.

The matrix encoder 31, slope encoder 41, and feature encoder 61 merely convert the one-out-of-N code manifestations of their respective connected units to a compatible code for processing by recorder 70. The slope encoder 41 will be described in greater detail, as it provides two different codes for operation of the segmenter 80.

In normal operation the curve follower 10, the matrix resolver 30, the slope detector 40, and the feature test circuits 60 would all operate in the manner described in one or more of the referenced copending applications. Through their encoders the successive characteristics of each separate symbol would be recorded in recorder 70 following a character identity record produced by the character identity generator 90. Every time an end-of-segment is detected by the segmenter 80, this will yield a signal on line 80A to record the segment end in its appropriate serial position on the record. The record produced by the recorder 70 could, for example, be a magnetic tape on which would be recorded the character identity, followed by a succession of coded indicia indicative of the successively detected characteristics. These would include slopes, matrix positions, features, and the inserted segment marks. The record, thus produced, can then be processed in a digital data processing machine for the assistance of the machine designer.

When the machine designer has finished analyzing the record produced by recorder 70 and completed his logic design for achieving identification of unknown cursive script lexical symbols, the segmenter 80 can be incorporated as an element in the character recognition machine itself, for a segment end is, in actuality, but a special feature.

Figure 2:
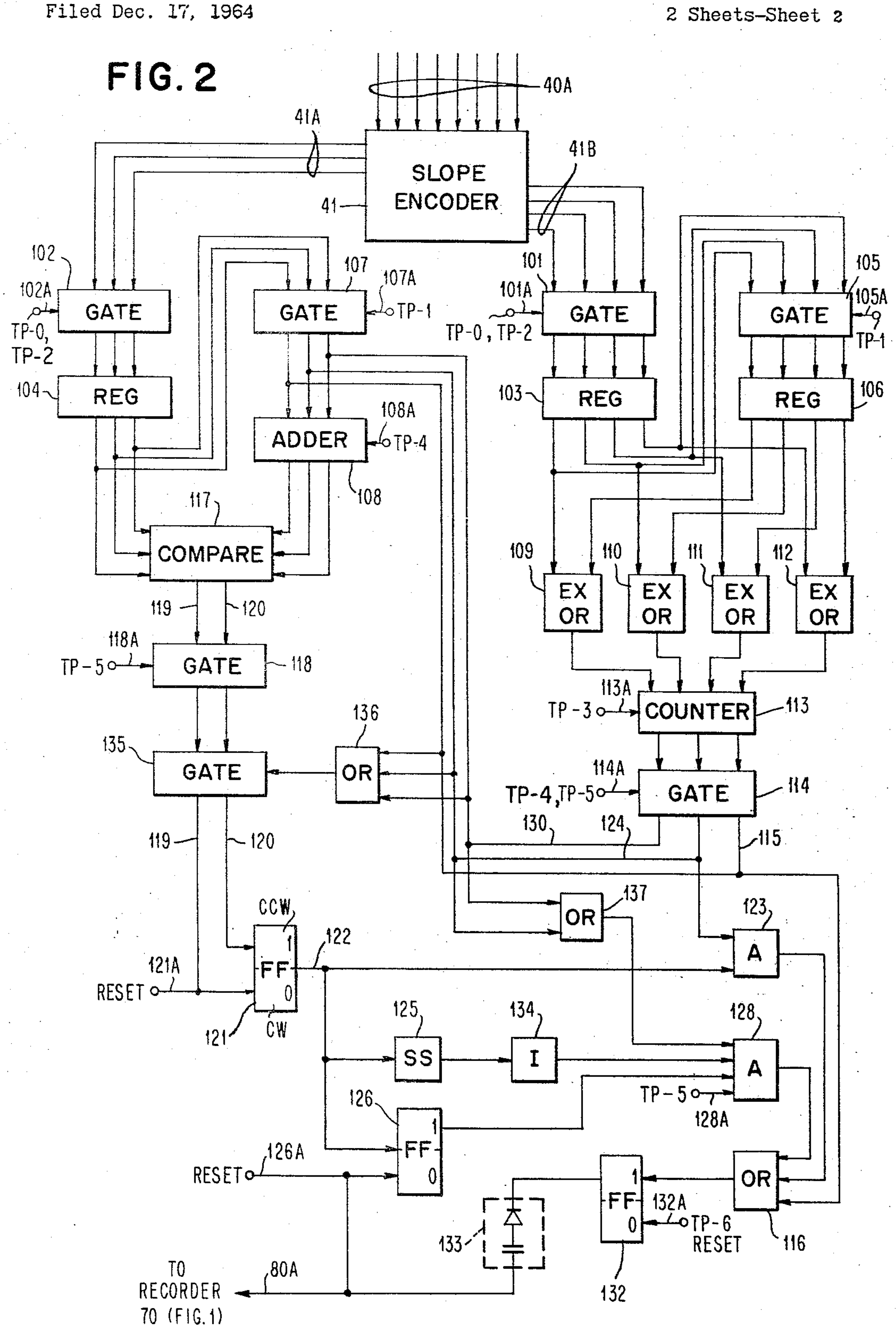
FIG. 2 is a detailed diagram of the preferred embodiment of the invention.

Referring now to FIG. 2 which shows the details of the segmenter 80 and slope encoder 41, it should be noted that the segmenter yields a signal every time the slope changes by four sectors, or the slope reverses with a magnitude of more than two cumulative sectors. The significance of this simple relationship will be immediately apparent if one but pauses to consider the nature of a curve follower, such as the apparatus 10. This apparatus actually follows the edge of a line by detecting and responding to the change in illumination as the flying spot enters the black of the line from the white background. Thus, the unadorned numeral one would be traced by a south-proceeding trace followed by a northerly trace with two 180° transitions. The numeral one would, therefore, yield two segments one on the right and one on the left. The segmenter would, therefore, detect the change of four sectors (180°) and signal the segment end at the top and the bottom of the symbol.

A 180° reversal cannot be said to be either clockwise or counter-clockwise, if one views only the initial and final conditions without reference to the transition. Since a line end represents a substantially infinite rate of change, the apparatus arbitrarily calls this a segment end, even though, in actuality, the vectors continue their rotation in the same direction. Because of the structure of the curve follower 10, a line end can only be traversed with a clockwise heading change.

The reason for the selection of a two sector cumulative reversal is also easily understood. If, for example, the trace were proceeding upwardly to the right along a line inclined 22½° from the vertical, this line is the boundary between the north and northeast sectors. The slope detector 40 could, therefore, conceivably vacillate between these two sectors. This vacillation represents a reversal in the direction of rotation of the magnitude of one sector, yet truly it is a movement in the NNE direction, which cannot be resolved. Therefore, the arbitrary ruliness of two cumulative sectors has been imposed on the apparatus. Thus, an N followed by NE followed by an E vector represents a two sector change clockwise. If the preceding change had been from NE to N (counter-clockwise), then the subsequent change from N to E without an intervening reversal would delineate a segment end.

The segmenter 80 operates to detect the magnitude of the slope change as well as the direction of the change. A magnitude change of four (180°) automatically signals a segment end. A direction change having a magnitude of two or three, signals a segment end. A direction change of one cocks a circuit, which effectively looks for another direction signal of one or more, to signal the segment end.

The encoder 41 encodes eight slope detector signals appearing as a one-out-of-eight code on the lines 40A into two distinct codal notations. This conversion can be effected by a diode matrix connected between the appropriate ones of the lines 40A and the lines 41A and 41B in accordance with the following relationships:

| | Pure Binary (41A) | Reflected Binary (41B) |
|---|---|---|
| North | 000 | 0000 |
| Northeast | 001 | 0001 |
| East | 010 | 0011 |
| Southeast | 011 | 0111 |
| South | 100 | 1111 |
| Southwest | 101 | 1110 |
| West | 110 | 1100 |
| Northwest | 111 | 1000 |

Examination of the preceding table reveals that the number of differing orders in the reflected binary code measures the magnitude of the change. This then, permits the reflected binary code values of two successive headings to be compared, and the number of disagreements counted to obtain the magnitude of the change. If this magnitude of change (expressed as a pure binary number) is now added to that pure binary number representing the original heading and compared with the pure binary number representing the new heading, equality will be achieved only if there has been a clockwise change in the vector direction. An unequal signal will be produced if the vector direction change has been counter-clockwise. The pure binary addition is effected without the end-around carry to cope with the transition through zero.

The application of foregoing rules can better be understood by reference to a few examples. Let us first consider a transition from NW to NE. This transition is expressed in the reflected binary code as a change from 1000 to 0001 giving rise to discrepancies in the first and last orders, a difference of two. When this difference of two (expressed in pure binary form as 010) is added to 111 (the northwest pure binary notation), the sum (without end-around carry) is 001, the northeast pure binary notation. A comparison between the desired new heading notation (001) and the old pure binary heading (111) augmented by two (010) yields an equal signal indicating the clockwise rotation.

If the change has been from NE to NW, the reflected binary code difference (010) when *added* to 001 (the original heading expressed in pure binary) yields 011 which will not compare with the new pure binary northwest notation of 111, thus leading to the conclusion of a counter-clockwise rotation.

Reduced to its simplest essence, the structure illustrated in FIG. 2 resolves into means for storing the pure binary and reflected binary codal values of two successive vectors, means for comparing the reflected binary values to obtain a magnitude difference, means for incrementing the pure binary heading representing the old heading by an amount (expressed in pure binary form) equal to the difference, and means for comparing the thus incremented number with the pure binary number representing the new heading to detect an equality or inequality. An equality signals a clockwise rotation and an inequality, a counterclockwise rotation. The detailed apparatus for effecting this simple function becomes somewhat involved, but reference to FIG. 2 will reveal at least one embodiment, the preferred one, which will accomplish the purpose.

It is also possible, though painfully tedious, to achieve the same effect manually with a pencil and paper. To this end, one draws a lexical symbol and surrounds it with a trace spaced away from the line edge by a small distance. One then applies to this trace a series of evenly and closely spaced dots. He then makes a tabulation of the successive binary and reflected binary code values for the heading at each successive spot, using a protractor, if necessary, to resolve the slopes into sectors. He then pairs the tabular entries, the first with the second, the second and third, third and fourth, etc., and performs the arithmetic operations above noted. When a transition point in accordance with the definition occurs, the spot at which the transition occurred is marked. One complete turn around the symbol thus drawn, will yield the same segmentation as would be produced if it were traced by the automated version thereof, now to be described.

The curve follower 10 (FIG. 1) makes its first intercept with a symbol and starts to trace in a clockwise direction. All circuits in the segmenter are, therefore, initially reset to register a clockwise rotation. Further, since the first intercept produces the first datum sample, comparison of that sample with either a datum from the previously traced symbol, or with zero, would yield an erroneous comparison. Therefore, an extra initial data entry cycle is effected to initiate the operation.

Wherein the label "reset" appears in FIG. 2 this indicates that the hub thus labelled is impulsed prior to a trace of a new symbol so as to reset the rotation indicator flip-flop 121 to clockwise rotation, the "waiting" flip-flop 126 to the "not-waiting" condition, and the end of segment flip-flop 132 to reset state. The sequence of events is indicated by the label TP followed by a numeral. TP–0 occurs only upon the initial intercept and prevents the faulty operation above-described. The remaining TP intervals represent timing pulses and their order of occurrence, TP–1 through TP–6 occurring every sampling period in seriate order.

The sampling periods correspond to the dots that were manually placed upon the trace in the manual method described above. This sampling occurs at periodic intervals spaced along the trace, and at each sampling period the events timed by TP–1 through TP–6 occur. When the first, or measuring pass is made about the symbol, the curve follower proceeds around the periphery at a standard speed. Since distance equals the product of time and speed, the time that the follower takes to circumnavigate the symbol on the first pass is a measure of the periphery thereof. Therefore, if an integrator is charged at a constant rate during the measuring pass, its final voltages charge will be a measure of the length of the periphery. Since the curve follower has a built-in resolution control, it will adjust its speed to circumnavigate all symbols in substantially the same time. The integrated voltage charge is used to set the frequency of an oscillator whose waveform output is converted to square waves to produce the requisite succession of sampling pulses. The effect of this operation is to divide a given symbol into substantially the same number of sampling periods independent of its magnification. The operation of circuits for effecting this sampling is more fully described in the copending application of E. C. Greanias, Ser. No. 381,134, filed July 8, 1964, now Patent 3,273,124 and assigned to the same assignee as the present application.

In FIG. 2, the slope detector 40 develops slope signals continuously on the lines 40A as the curve follower traces around the symbol. Since there can only be one velocity vector heading at a time, only one of the lines 40A will be potentialized at any one time. This potentialization produces a corresponding combinational potentialization of the output lines 41A and 41B in accordance with the codal values previously tabulated. The slope encoder 41 may assume many forms, but a simple diode matrix will implement the function most simply.

Upon the first intercept of the curve follower with a symbol, the follower itself generates a signal which causes it to switch from the raster search mode of operation to the curve following mode of operation. This same signal can be used to produce the TP–0 timing pulse. It is assumed that all resets were effected upon completion of the trace of the previous cycle.

When the TP–0 arises, it will open gates 101 and 102 (through hubs 101A and 102A) to enter the reflected binary code value and the pure straight binary code value corresponding to the initial heading into the registers 103 and 104 respectively. When the first repetitive timing pulse TP–1 arrives, upon occurrence of the first sampling period, it will open gate 105 (through hub 105A) to enter the initial reflected binary heading standing in register 103 into the register 106. At the same time, TP–1 will open gate 107 to shift the contents from register 104 into the adder 108. The adder 108 operates as a parallel entry register for this operation and does not add the entry gated thereto by gate 107; it merely enters it, forcing the respective adder orders to switch to correspond to the entry. We now have the initial heading vector notations entered into the registers 103, 104, 106, and 108 (adder).

Upon the following pulse, TP–2, gates 101 and 102 are opened to permit the entry of the new heading into the registers 103 and 104. The first pair of successive heading vectors is now loaded. The contents of registers 103 and 106 will now compare in the four exclusive OR gates 109 through 112. True to the logic they perform, each of these gates will yield an output only if their inputs differ. Since the reflected binary code was chosen for this very purpose, the number of energized gates 109 through 112 will measure the magnitude of the difference. Upon the occurrence of pulse TP–3, the pure binary counter 113 will be energized to count the number of outputs from the exclusive OR gates 109 through 112.

At time TP–4, the gate 114 will be opened to pass the count appearing in counter 113. If the magnitude of the vector change is four, line 115 will be potentialized directly and through OR gate 116 will switch the end of segment flip-flop 132. If the count is zero through four, the gate 114 will enter the count additively into binary adder 108, now conditioned to add by control on hub 108A, as combinations of potentials on the bit lines 130 ($2^0$), 124 ($2^1$), and 115 ($2^2$). Adder 108 will now contain the old heading incremented by the magnitude of change. Except for a zero change in heading, a comparison of this incremented value with the heading value standing in register 104 will yield an equality signal if the rotation is clockwise, and an inequality signal if the rotation is counter-clockwise. These comparison signals on lines 119 and 120 are gated through gate 118 at time TP–5 and through gate 135, which is normally open, to force the rotation direction flip-flop 121 to store the corresponding direction. If the change in direction is of zero magnitude, this would result in an equal signal from the comparator, even though the prior direction of rotation had been counter-clockwise. To prevent a false switch from counter-clockwise to clockwise in this special instance, OR gate 136, connected to the bit lines 130, 124, and 115 from the gate 114 (also open at TP–5 time) will not yield any output if the difference is zero. Gate 135 will, therefore, not be open at time TP–5 to permit the comparator 117 to switch the flip-flop 121 for a zero difference.

When flip-flop 121 switches in either direction, a pulse appears on line 122 connected to the complementing output from the flip-flop. This pulse is combined in AND gate 123 with line 124 (energized if the difference is two or three) to switch the end of segment flip-flop 132 through OR gate 116.

When flip-flop 121 switches, it always complements the state of the "waiting flip-flop" 126 through connection of line 122 to the complementing input of the flip-flop 126. This latter flip-flop "waits for" a change of at least one in the following sampling period. When flip-flop 121 switches, it also fires single shot 125, which through inverter 134 prevents AND gate 128 from operating in the same sampling period which saw the change in state of flip-flop 121. Single shot 125 has a period slightly longer than that of TP–5.

In the next sampling period, the direction flip-flop 121 may switch back, measuring the vacillation previously referred to. In such instance, AND gate 128 will again be blocked. Also, flip-flop 126 will be reset to the "not waiting" condition. It is only when a direction change occurs following by a vector rotation in the same direction will the "waiting flip-flop" 126 be active to cause an end of segment detection. Assuming that the waiting flip-flop has been switched in the previous cycle and "is waiting," then in the next following cycle, if the difference is one (or greater, except four) line 130 or line 124 will be potentialized at time TP–5 when the timing pulse is applied to AND 128 to create the end of segment pulse for OR gate 116 to operate end of segment flip-flop 132. The OR gate 137 enables the AND gate 128 if the magnitude count is one, two, or three. Were it four, line 115 would provide the segment end signal directly.

If, at time TP–6, the end of segment flip-flop 132 has been set, the application of the TP–6 pulse to the reset hub 132A will produce an output response through the unilateral differentiation coupling 133 to line 80A. This same pulse will reset the "waiting flip-flop" 126.

While it may appear that it is necessary to block the operation of gate 135 upon a difference of four, this is unnecessary. Because the curve follower "dither" circle rotates clockwise, it can only traverse a line end with a clockwise change in vector heading. Therefore, all 180° changes in direction will properly yield a clockwise rotational change in vector heading when a line end is detected. The direction of change is, however, immaterial.

The operation of the segmenter 80 as above-described continues through each separate sampling period, each time a new pair of vector headings is shifted, entered, and compared. Effectively, this comparison of successive slope pairs is the rough equivalent of performing a second differentiation and comparing accelerations. Since the slopes (velocities) are only resolved into eight sectors and the sampling periods are substantially longer than zero length, the analogy is at best a rough one. There is, however, nothing to preclude making the resolution finer and the sampling periods closer. The above-referenced copending application S.N. 385,464 teaches how sixteen sector resolution may be achieved. In such case, the instant invention would effect segmentation upon a change in magnitude of eight sectors, or a reversal in slope of two or more cumulative sectors.

From the foregoing, it will readily be appreciated that any closed path trace can be segmented in accordance with the principles disclosed. If the slope of the closed path is resolved into any number of sectors, N, then a segment will terminate whenever the slope reverses by more than two sector magnitudes, or the slope changes with a magnitude of $N/2$ sectors, wherein each sector includes an angle of $2\pi/N$ radians.

While the invention has been particularly shown and described with reference to a preferred embodiment thereof, it will be understood by those skilled in the art that various changes in form and details may be made therein without departing from the spirit and scope of the invention.

What is claimed is:

Apparatus for dividing the trace produced by a curve follower in following the outer line edge periphery of a lexical symbol into a plurality of segments, comprising:

(a) follower means for following the line edge outline of the symbol in a closed unidirectional trace and producing time variant signals whose amplitude manifest the successive orthogonal displacements of the trace;

(b) means for continuously processing said time variant signals to produce successive first sets of coded signals manifestive of the successive angular sectors containing the successive instantaneous tangential velocity vectors of the path followed by said follower means, each sector including an angle of $2\pi/N$ radians, where N is an even integer greater than six;

(c) means for periodically sampling said first sets of coded signals;

(d) means for comparing each of said first sets of sampled signals with the set preceding it in successive pairs, and deriving a further set of coded signals manifestive of the number of sectors change in the vector heading, and producing a direction signal manifestive of the direction of rotation of the velocity vector between the successive sampled sets;

(e) means responsive to a magnitude of $N/2$ of said further set of coded signals for producing an end of segment signal;

(f) means responsive to a change in said direction signal and an accumulated magnitude of at least two sectors of direction change for producing an end of segment signal.

References Cited

UNITED STATES PATENTS

| | | | |
|---|---|---|---|
| 2,980,332 | 4/1961 | Brouillette et al. | 235—189 |
| 2,983,822 | 5/1961 | Brouillette | 250—202 |
| 2,986,643 | 5/1961 | Brouillette | 250—202 |
| 2,994,779 | 8/1961 | Brouillette | 250—200 |
| 3,015,730 | 1/1962 | Johnson | 250—202 |

DARYL W. COOK, *Acting Primary Examiner.*

MAYNARD R. WILBUR, *Examiner.*

J. I. SCHNEIDER, *Assistant Examiner.*